(12) United States Patent
Yamamoto et al.

(10) Patent No.: US 8,657,339 B2
(45) Date of Patent: Feb. 25, 2014

(54) STEERING APPARATUS

(75) Inventors: Kou Yamamoto, Gunma-ken (JP);
Noritomo Narita, Gunma-ken (JP);
Youhei Nakazato, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/521,041

(22) PCT Filed: Apr. 2, 2012

(86) PCT No.: PCT/JP2012/058887
§ 371 (c)(1),
(2), (4) Date: Jul. 6, 2012

(87) PCT Pub. No.: WO2012/137720
PCT Pub. Date: Oct. 11, 2012

(65) Prior Publication Data
US 2012/0324965 A1  Dec. 27, 2012

(30) Foreign Application Priority Data
Apr. 4, 2011 (JP) ................................. 2011-082564

(51) Int. Cl.
*B62D 1/185* (2006.01)

(52) U.S. Cl.
USPC ..................................................... 280/777

(58) Field of Classification Search
USPC .................. 280/771; 70/183; 74/492, 495
See application file for complete search history.

(56) References Cited

U.S. PATENT DOCUMENTS

| | | | |
|---|---|---|---|
| 4,287,786 A * | 9/1981 | Berginski | 74/492 |
| 4,967,858 A * | 11/1990 | Kotake et al. | 180/444 |
| 5,020,616 A * | 6/1991 | Yagi et al. | 180/444 |
| 5,722,300 A * | 3/1998 | Burkhard et al. | 74/493 |
| 6,254,131 B1 * | 7/2001 | Link | 280/779 |
| 6,892,602 B2 * | 5/2005 | Hirschfeld et al. | 74/484 R |
| 7,410,190 B2 * | 8/2008 | Sawada et al. | 280/777 |

(Continued)

FOREIGN PATENT DOCUMENTS

| | | |
|---|---|---|
| JP | 60-9744 U | 1/1985 |
| JP | 61-108031 A | 5/1986 |

(Continued)

OTHER PUBLICATIONS

English translation of International Preliminary Report on Patentability from International Patent Application No. PCT/JP2012/058887, transmitted Oct. 17, 2013.

*Primary Examiner* — Karen Beck
(74) *Attorney, Agent, or Firm* — Miles & Stockbridge P.C.

(57) ABSTRACT

In a steering apparatus configured by including: a steering shaft to which a steering wheel can be fitted; a steering column supported on a vehicle body and supporting the steering shaft rotatably; and a combination switch fixedly fitted to the steering column and constructed by combining a plurality of switches having different functions into one integral unit, the improvement comprises: a spacer having an inner peripheral surface that is fixedly fitted onto an outer peripheral surface of an end portion of the steering column on a rear side with respect to a vehicle body and an outer peripheral surface that is formed to have a dimension of an outer diameter enabling an inner peripheral surface of a fitting portion provided in the combination switch to be fitted onto the outer peripheral surface; and a rotation preventive mechanism preventing the spacer from rotating about the steering column. With this configuration, the same combination switch can be fitted to plural types of columns having different dimensions of outer diameters.

9 Claims, 13 Drawing Sheets

(56) References Cited

U.S. PATENT DOCUMENTS

| | | |
|---|---|---|
| 7,552,946 B2 * | 6/2009 | Kuerschner et al. ........... 280/779 |
| 7,571,664 B2 * | 8/2009 | Altmann et al. ................. 74/492 |
| 8,132,828 B2 * | 3/2012 | Wright ........................... 280/771 |
| 2007/0039402 A1 * | 2/2007 | Hebenstreit et al. ............. 74/492 |
| 2007/0137377 A1 * | 6/2007 | Kamei ............................. 74/493 |
| 2007/0209864 A1 * | 9/2007 | Segawa et al. ................. 180/446 |
| 2009/0133452 A1 * | 5/2009 | Hirche et al. ................... 70/183 |
| 2009/0183588 A1 * | 7/2009 | Hebenstreit et al. ............ 74/492 |
| 2009/0260408 A1 * | 10/2009 | Tsukazaki ....................... 70/183 |
| 2012/0324965 A1 * | 12/2012 | Yamamoto et al. ............. 70/183 |

FOREIGN PATENT DOCUMENTS

| | | |
|---|---|---|
| JP | 6-1847 U | 1/1994 |
| JP | 6-227403 A | 8/1994 |
| JP | 2000-3638 A | 1/2000 |
| JP | 2003-72517 A | 3/2003 |
| JP | 2003-123927 A | 4/2003 |

* cited by examiner

STEERING APPARATUS

TECHNICAL FIELD

The present invention relates generally to a steering apparatus, and more particularly to a fitting structure for fitting a combination switch to a steering column and also to a steering apparatus enabling the combination switch having the same or common specifications, i.e., having the same size and the same shape to be fitted to plural types of steering columns having different dimensions of outer diameters.

BACKGROUND ART

The combination switch is fitted to the vicinity of a steering wheel of a steering column of an automobile. The combination switch is a switch unit configured to combine a plurality of switches such as a lighting switch and a windscreen wiper switch having functions different from each other into one integral unit. A fitting structure for fitting the combination switch to the steering column is, as disclosed in Japanese Patent Application Laid-Open No. 2000-3638, such that an inner peripheral surface of a fitting portion provided in the combination switch is fitted onto an outer peripheral surface of the steering column, thus making the steering column concentric with the combination switch. Further, the combination switch is positioned in an axial direction with respect to the steering column by abutting an end face of the combination switch against an end face of the steering column, and is also positioned and fixed in a rotating direction with respect to the steering column by fastening the combination switch to a fitting bracket with bolts, which bracket is fixed by welding to the steering column.

It is desirable for reducing a manufacturing cost of the combination switch that the combination switch having the same or common specifications is used in common to multiple types of cars. In a conventional method of fitting the inner peripheral surface of the combination switch onto the outer peripheral surface of the steering column, however, it is required that the combination switch used in common can be fitted to the steering column for a heavy duty or large-sized vehicle. If so, the dimensions of the outer diameters of the steering column and the steering shaft for even a small-sized vehicle are required to be equal to those for the heavy duty or large-sized vehicle, resulting in an excess over the optimum dimensions for the small-sized vehicle. Therefore, the steering apparatus increases in weight, and resultantly there is a possibility that the manufacturing cost of the whole steering apparatus increases.

DOCUMENT OF PRIOR ART

Patent Document

[Patent document 1] Japanese Patent Application Laid-Open No. 2000-3638

SUMMARY OF THE INVENTION

It is an object of the present invention to provide, in a steering apparatus including a combination switch, a steering apparatus enabling a combination switch having the same or common specifications to be fitted to a steering column having a dimension of an outer diameter that differs depending on a difference in type of a vehicle.

The problems given above are solved by the following means. To be specific, in a steering apparatus configured by including: a steering shaft to which a steering wheel can be fitted; a steering column supported on a vehicle body and supporting the steering shaft rotatably; and a combination switch fixedly fitted to the steering column and constructed by combining a plurality of switches having different functions into one integral unit, the improvement includes: a spacer having an inner peripheral surface that is fixedly fitted onto an outer peripheral surface of an end portion of the steering column on a rear side with respect to a vehicle body and an outer peripheral surface that is formed to have a dimension of an outer diameter enabling an inner peripheral surface of a fitting portion provided in the combination switch to be fitted onto the outer peripheral surface; and a rotation preventive mechanism preventing the spacer from rotating about the steering column.

Further, according to a preferred aspect of the present invention, the steering apparatus is characterized in that the rotation preventive mechanism of the spacer is configured by including a hole formed in the steering column and an engagement portion formed on the spacer and engaging with the hole.

Still further, according to another preferred aspect of the present invention, the steering apparatus is characterized in that the hole of the steering column is provided closer to the front side with respect to the vehicle body than a bearing fitted in an inner peripheral surface of the steering column and rotatably supporting the steering shaft.

According to yet further, still another preferred aspect of the present invention, the steering apparatus is characterized in that the engagement portions of the spacer are provided one by one on the right and left sides with respect to the vehicle body in a widthwise direction of the vehicle, and the holes of the steering column are provided one by one on the right and left sides with respect to the vehicle body in a widthwise direction of the vehicle.

Additionally, according to a further preferred aspect of the present invention, the steering apparatus is characterized in that the engagement portions of the spacer each is provided with a projection regulating a movement of the spacer in the axial direction with respect to the steering column by engaging with the hole provided in the steering column.

Additionally, according to a still further preferred aspect of the present invention, the steering apparatus is characterized in that the inner peripheral surface of the spacer is formed with a plurality of ridges projecting inward in a radial direction and interference fitted to the outer peripheral surface of the steering column.

Additionally, according to a yet further preferred aspect of the present invention, the steering apparatus is characterized in that the spacer is composed of a synthetic resin.

Additionally, according to a further preferred aspect of the present invention, the steering apparatus is characterized in that an end portion of the steering column on the rear side with respect to the vehicle body is formed to be a diameter-reduced portion whose outer peripheral surface is reduced in diameter than the outer peripheral surface on the front side with respect to the vehicle body, and the inner peripheral surface of the spacer is fitted onto the outer peripheral surface of the diameter-reduced portion.

Additionally, according to a further preferred aspect of the present invention, the steering apparatus is characterized in further including a positioning bracket that is fixed to the outer peripheral surface of the steering column on the front side with respect to the vehicle body and that positions the combination switch in the axial direction and in the rotating direction with respect to the steering column through the engagement with the combination switch.

Additionally, according to a further preferred aspect of the present invention, the steering apparatus is characterized in that a steering lock device for locking the steering shaft not to rotate is built in the combination switch, and the steering apparatus further includes a fitting bracket that is fixed to the outer peripheral surface of the steering column on the front side with respect to the vehicle body and on which the combination switch is to be mounted.

In the steering apparatus configured by including: a steering shaft to which the steering wheel can be fitted; a steering column supported on the vehicle body and supporting the steering shaft rotatably; and a combination switch fixedly fitted to the steering column and constructed by combining the plurality of switches having different functions into one integral unit, the steering apparatus of the present invention includes: a spacer having an inner peripheral surface that is fixedly fitted onto the outer peripheral surface of the end portion of the steering column on the rear side with respect to the vehicle body and an outer peripheral surface that is formed to have the dimension of the outer diameter enabling the inner peripheral surface of the fitting portion provided in the combination switch to be fitted onto the outer peripheral surface; and the rotation preventive mechanism preventing the spacer from rotating about the steering column.

Therefore, according to the present invention, the combination switch having the same or common specifications can be used in common to a multiplicity of car types. As a result, a manufacturing cost of the combination switch can be reduced, and a manufacturing cost of the whole steering apparatus can be also decreased. Namely, it is feasible to set the dimension of the outer diameter of the outer peripheral surface and the dimension of the inner diameter of the inner peripheral surface of the end portion of the steering column on the rear side with respect to the vehicle body irrespective of the dimension of the inner diameter of the inner peripheral surface of the fitting portion of the combination switch, which is fitted onto the outer peripheral surface of the steering column, thereby centering of the combination switch being performed. Accordingly, the diameters of the steering shaft and of the bearing can be set to the optimum dimensions corresponding to the displacement etc of the automobile on which the steering apparatus to be mounted, and hence it is possible to restrain the increase in weight of the steering apparatus and the rise in manufacturing cost thereof.

BRIEF DESCRIPTION OF THE DRAWINGS

FIG. 9A is a front view of the single spacer; FIG. 9B is a sectional view taken along the line IXB-IXB in FIG. 9A; FIG. 9C is a right side view in FIG. 9A; FIG. 9D is an enlarged view of a portion P in FIG. 9B; and FIG. 9E is an enlarged view of a portion Q in FIG. 9C.

MODE FOR CARRYING OUT THE INVENTION

Figure 3:
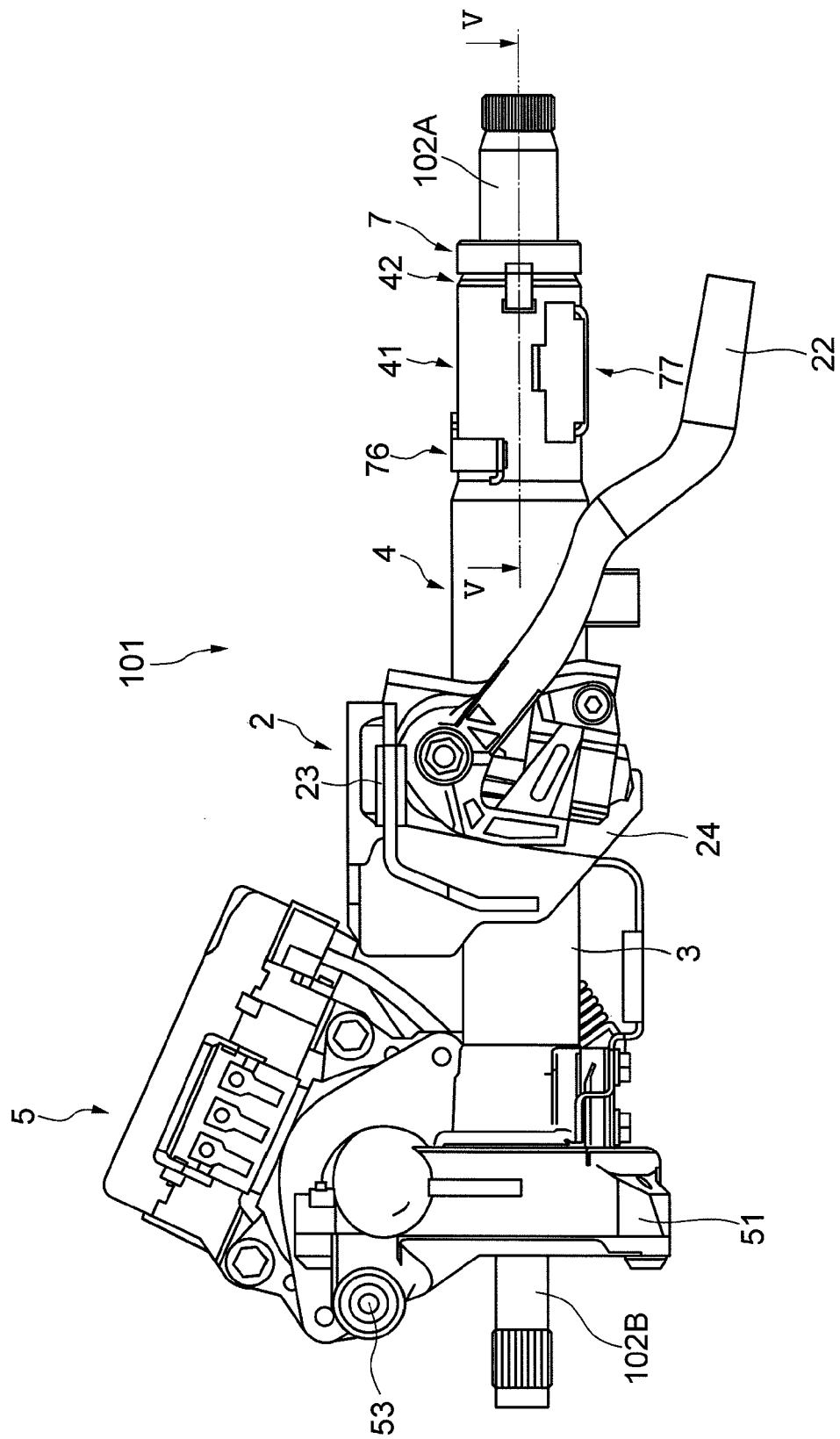
FIG. 3 is a front view illustrating a state before fitting a combination switch to the steering apparatus 101 according to the embodiment of the present invention.
Figure 4:
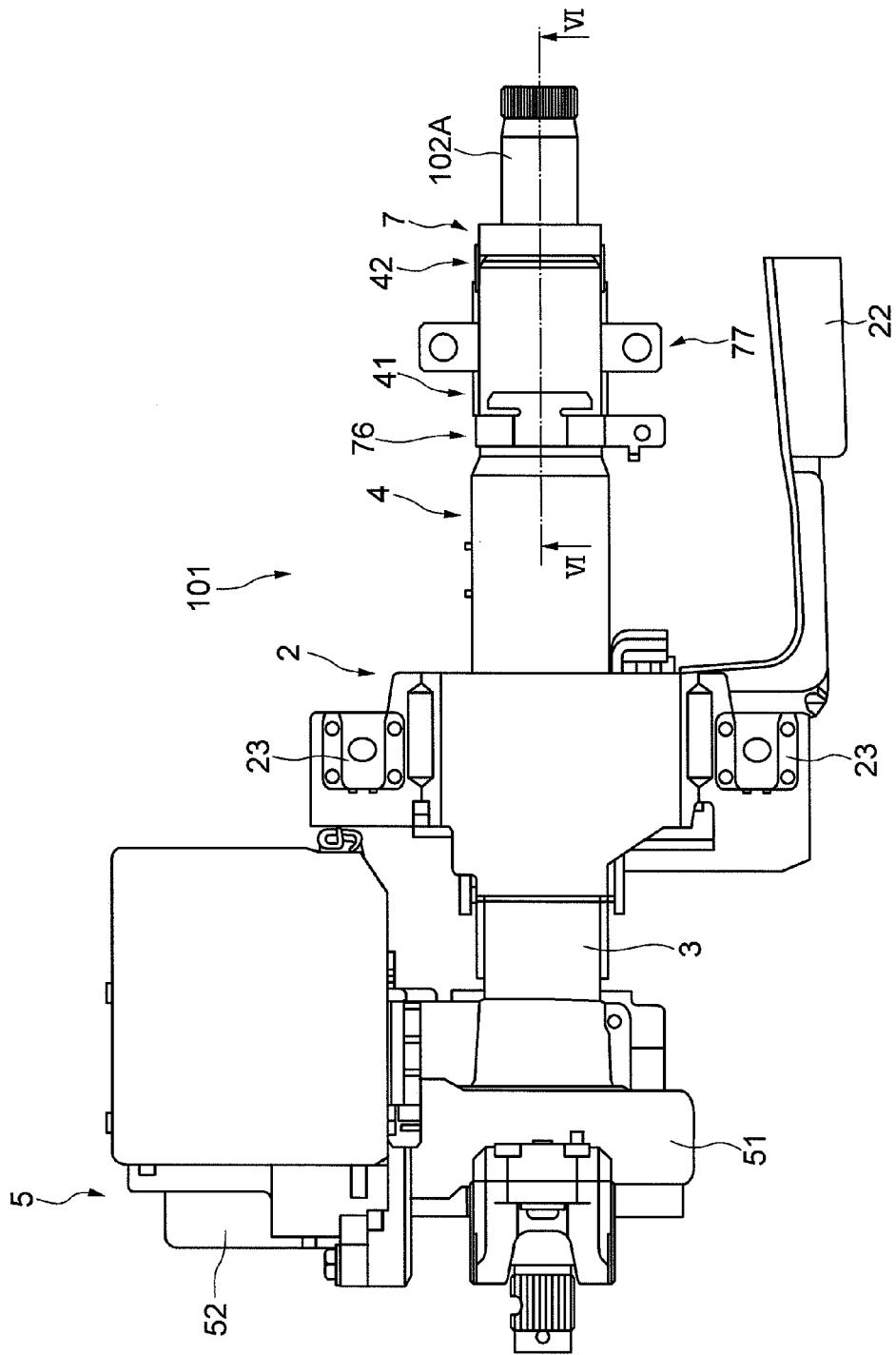
FIG. 4 is a plan view of FIG. 3.
Figure 5:
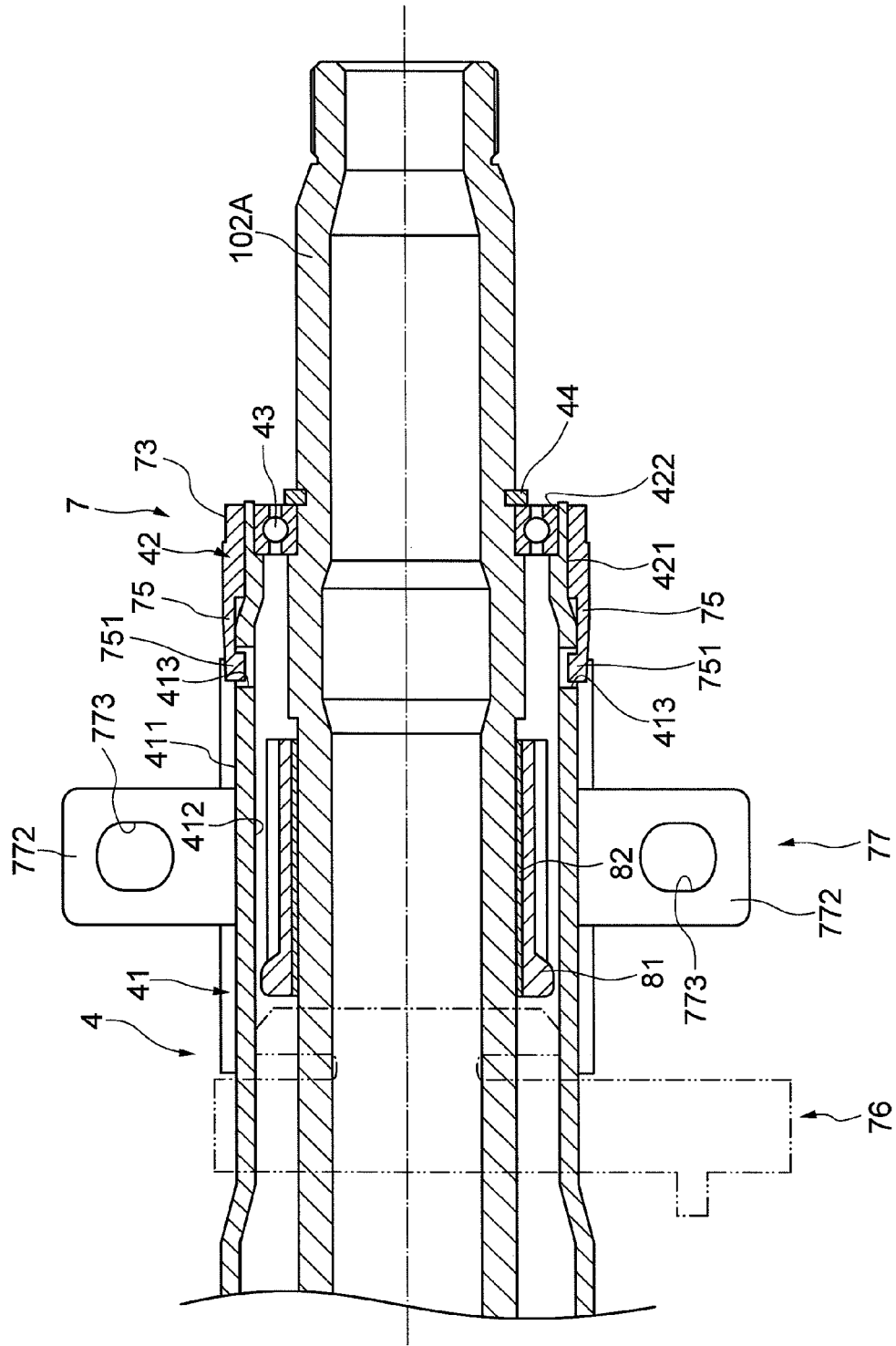
FIG. 5 is a sectional view taken along the line V-V in FIG. 3.
Figure 11:
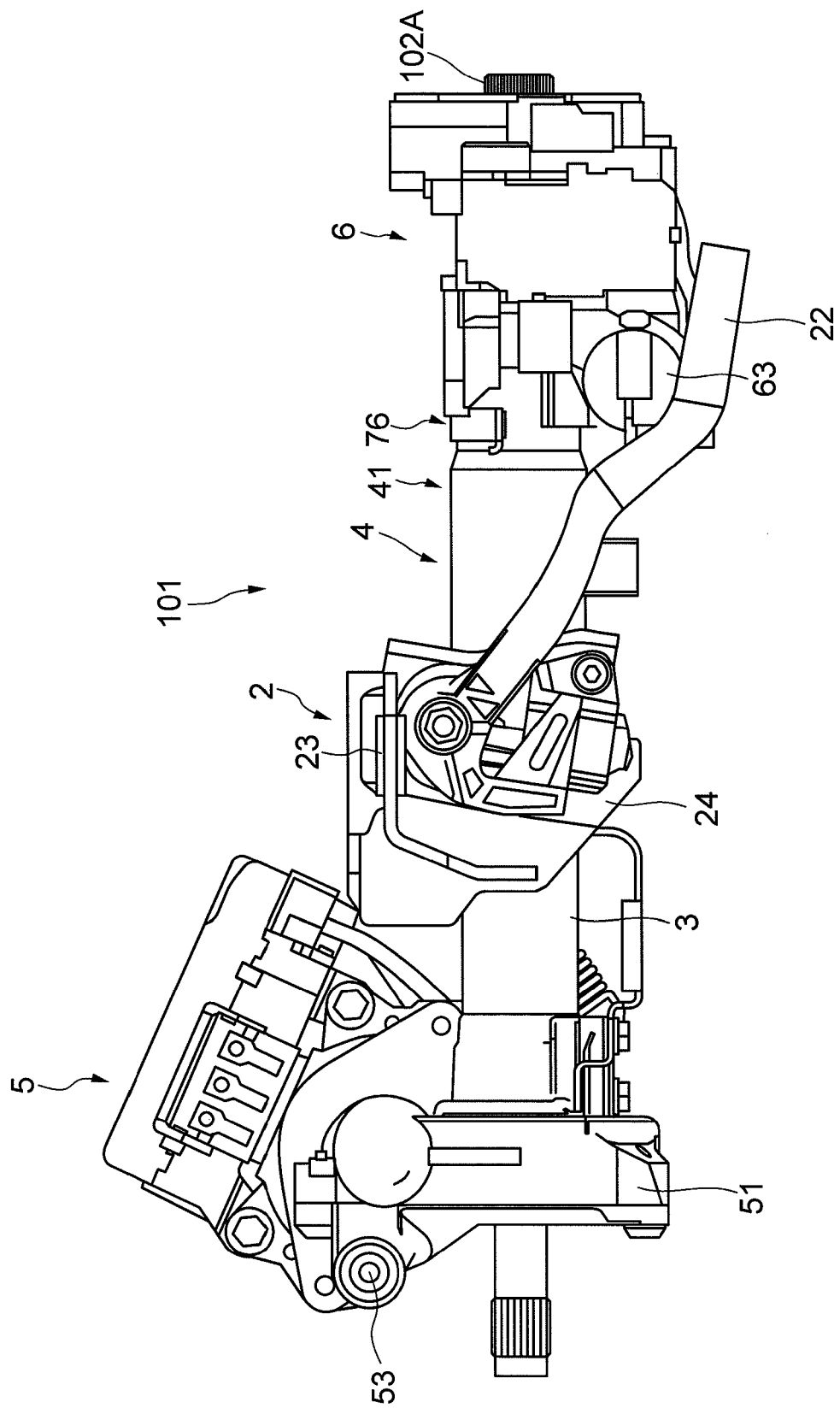
FIG. 11 is a front view illustrating a state after a combination switch has been fitted to the steering apparatus 101.
Figure 12:
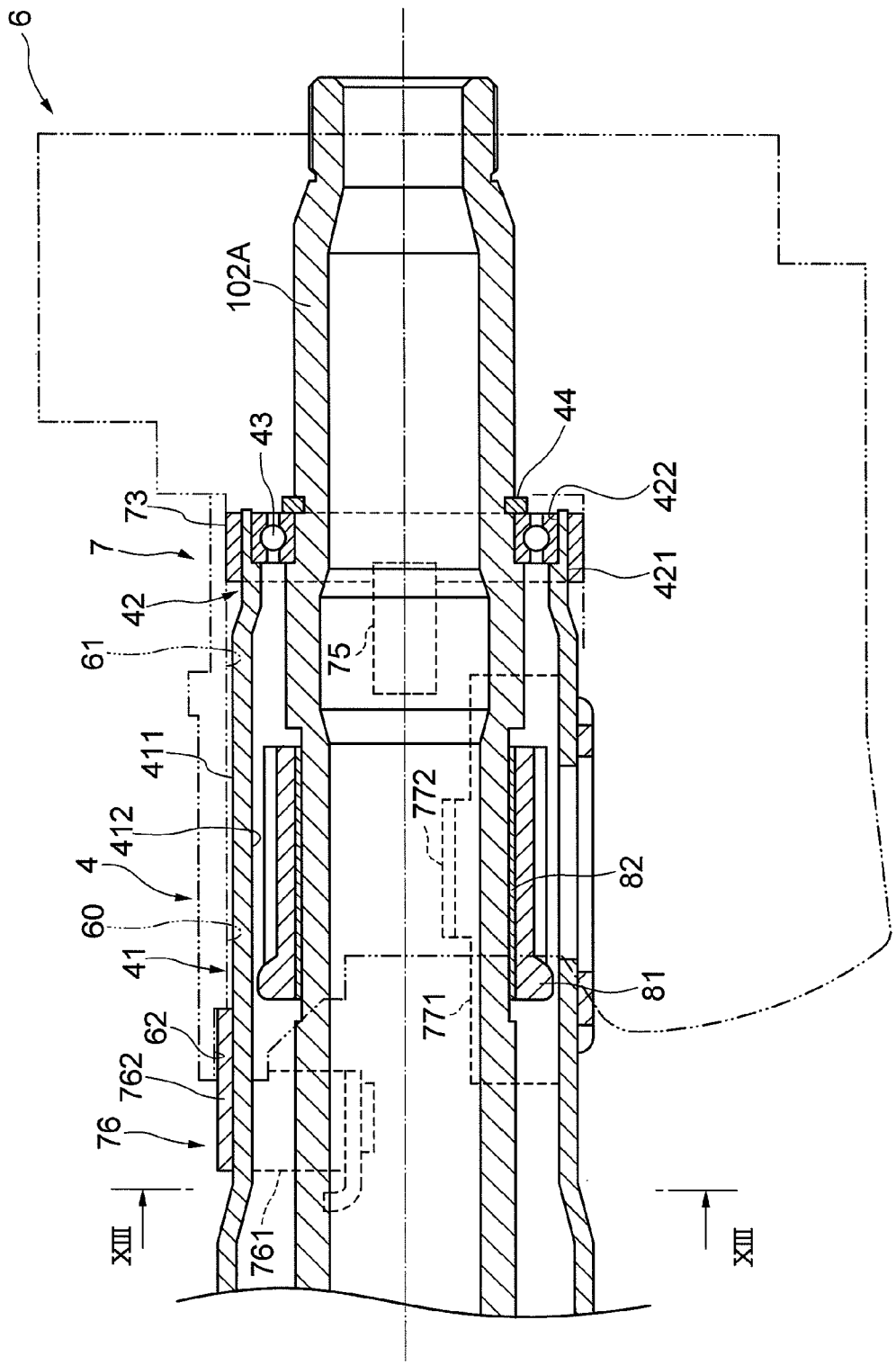
FIG. 12 is a view corresponding to FIG. 6, illustrating the state after the combination switch has been fitted to the steering apparatus 101.
Figure 13:
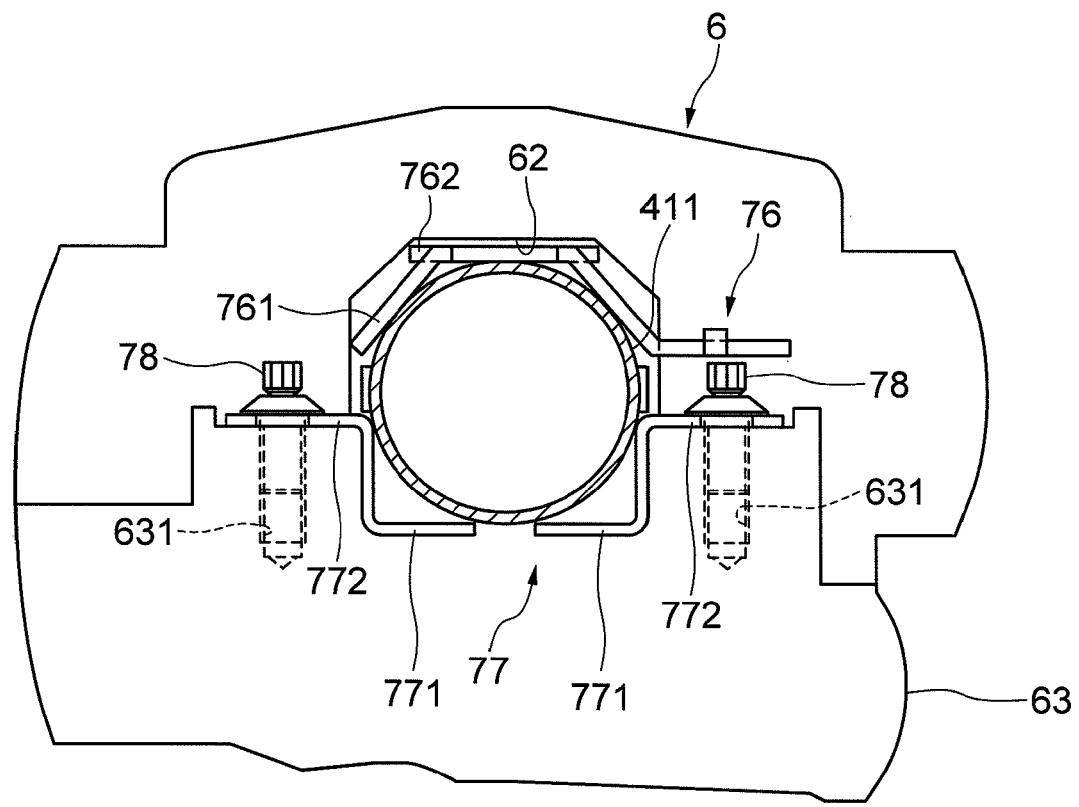
FIG. 13 is a sectional view taken along the line XIII-XIII in FIG. 12.

To begin with, directions pertaining to a steering apparatus in the present description are defined. In the present description, the directions pertaining to the steering apparatus are, unless otherwise specified, to be the same as forward, backward, rightward, leftward, upward and downward directions of a vehicle body in a state in which the steering apparatus is mounted on the vehicle body. The rightward and leftward directions are also referred to as vehicle widthwise directions. In FIGS. 1, 2, 7, 8 and 10, as viewed in a state of reading the reference numerals and symbols of the drawings in the normal directions, the left-oblique downward direction on the surface of the drawing sheet corresponds to the front side with respect to the vehicle body, the right-oblique upward direction on the surface of the drawing sheet corresponds to the rear side with respect to the vehicle body, the left-oblique upward direction on the surface of the drawing sheet corresponds to the right side in the vehicle widthwise directions, and the right-oblique downward direction on the surface of the drawing sheet corresponds to the left side in the vehicle widthwise directions. In FIGS. 3, 6, 11 and 12, as viewed in the state of reading the reference numerals and symbols of the drawings in the normal directions, the leftward direction on the surface of the drawing sheet corresponds to the front side with respect to the vehicle body, the rightward direction on the surface of the drawing sheet corresponds to the rear side of with respect to the vehicle body, the depthwise direction on the surface of the drawing sheet corresponds to the right side in the vehicle widthwise directions, and the near-side direction on the surface of the drawing sheet corresponds to the left side in the vehicle widthwise directions. In FIGS. 4 and 5, as viewed in the state of reading the reference numerals and symbols of the drawings in the normal directions, the leftward direction on the surface of the drawing sheet corresponds to the front side with respect to the vehicle body, the rightward direction on the surface of the drawing sheet corresponds to the rear side with respect to the vehicle body, the upward direction on the surface of the drawing sheet corresponds to the right side in the vehicle widthwise directions, and the downward direction on the surface of the drawing sheet corresponds to the left side in the vehicle widthwise directions. In FIG. 13, as viewed in the state of reading the reference numerals and symbols of the drawings in the normal directions, the near-side direction on the surface of the drawing sheet corresponds to the front side with respect to the vehicle body, the depthwise direction on the surface of the drawing sheet corresponds to the rear side with respect to the vehicle body, the leftward direction on the surface of the drawing sheet corresponds to the right side in the vehicle widthwise directions, and the rightward direction on the surface of the drawing sheet corresponds to the left side in the vehicle widthwise directions.

Figure 1:
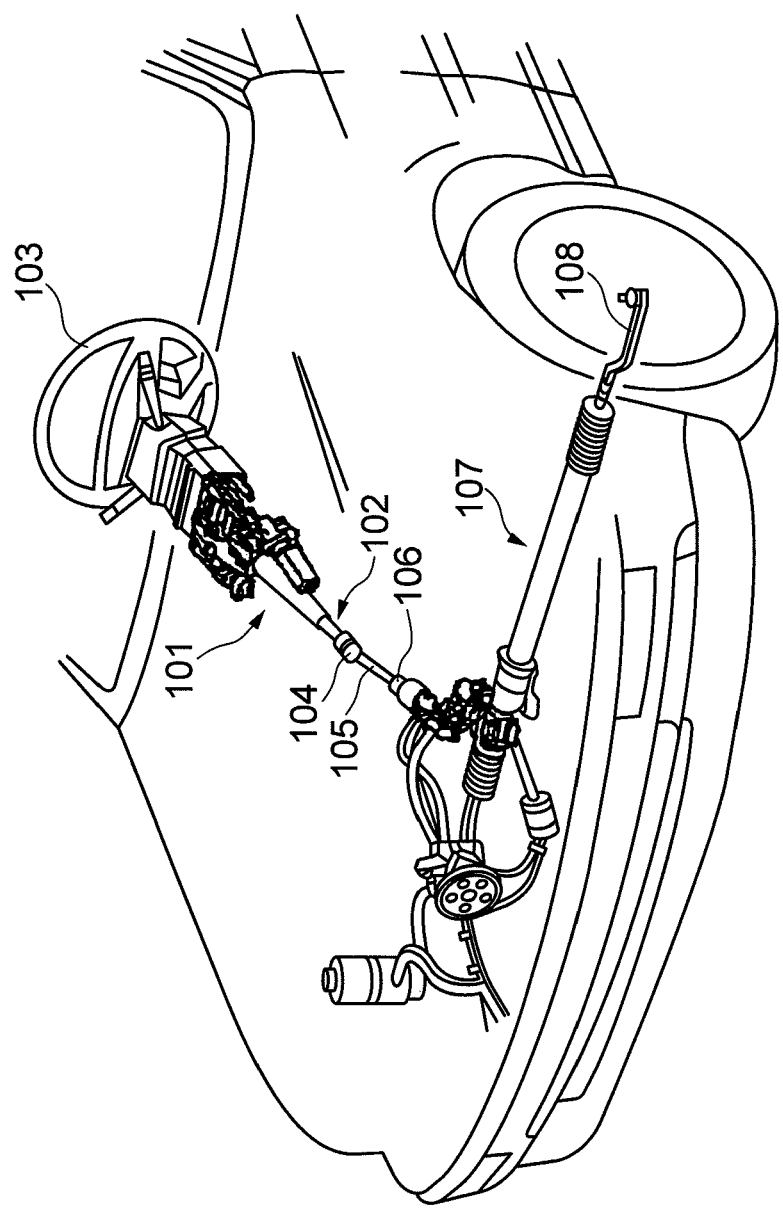
FIG. 1 is a whole perspective view illustrating a state of how a steering apparatus 101 according to an embodiment of the present invention is mounted in a vehicle.

FIG. 1 is a whole perspective view depicting the state of mounting a steering apparatus 101 in a vehicle according to the embodiment of the present invention. The steering apparatus 101 supports a steering shaft 102 rotatably. A steering wheel 103 is fitted to an upper end of the steering shaft 102 on the rear side with respect to the vehicle body, and an intermediate shaft 105 is joined via a universal joint 104 to a lower end of the steering shaft 102 on the front side with respect to the vehicle body.

A universal joint 106 is joined to the lower end of the intermediate shaft 105, and a steering gear assembly 107 constructed of a rack-and-pinion mechanism etc is joined to the universal joint 106.

When a driver rotationally operates the steering wheel 103, a rotary force thereof is transferred to the steering gear assembly 107 via the steering shaft 102, the universal joint 104, the intermediate shaft 105 and the universal joint 106, and a tie rod 108 is moved through the rack-and-pinion mechanism, thereby enabling a steering turning angle of the wheels to be changed.

Figure 2:
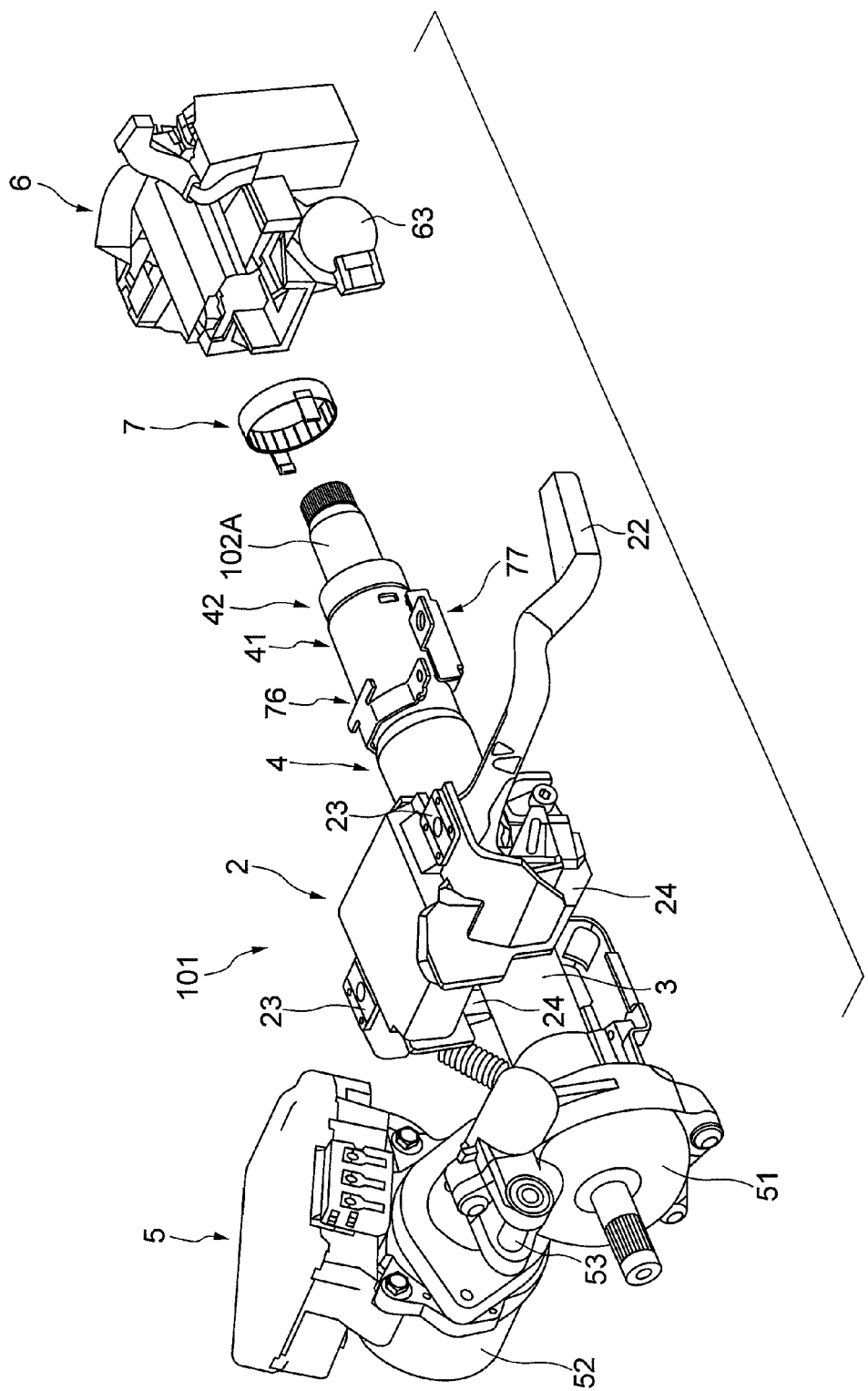
FIG. 2 is an exploded perspective view of a principal portion of the steering apparatus 101 according to the embodiment of the present invention as viewed from upside on the front side with respect to a vehicle body.
Figure 6:
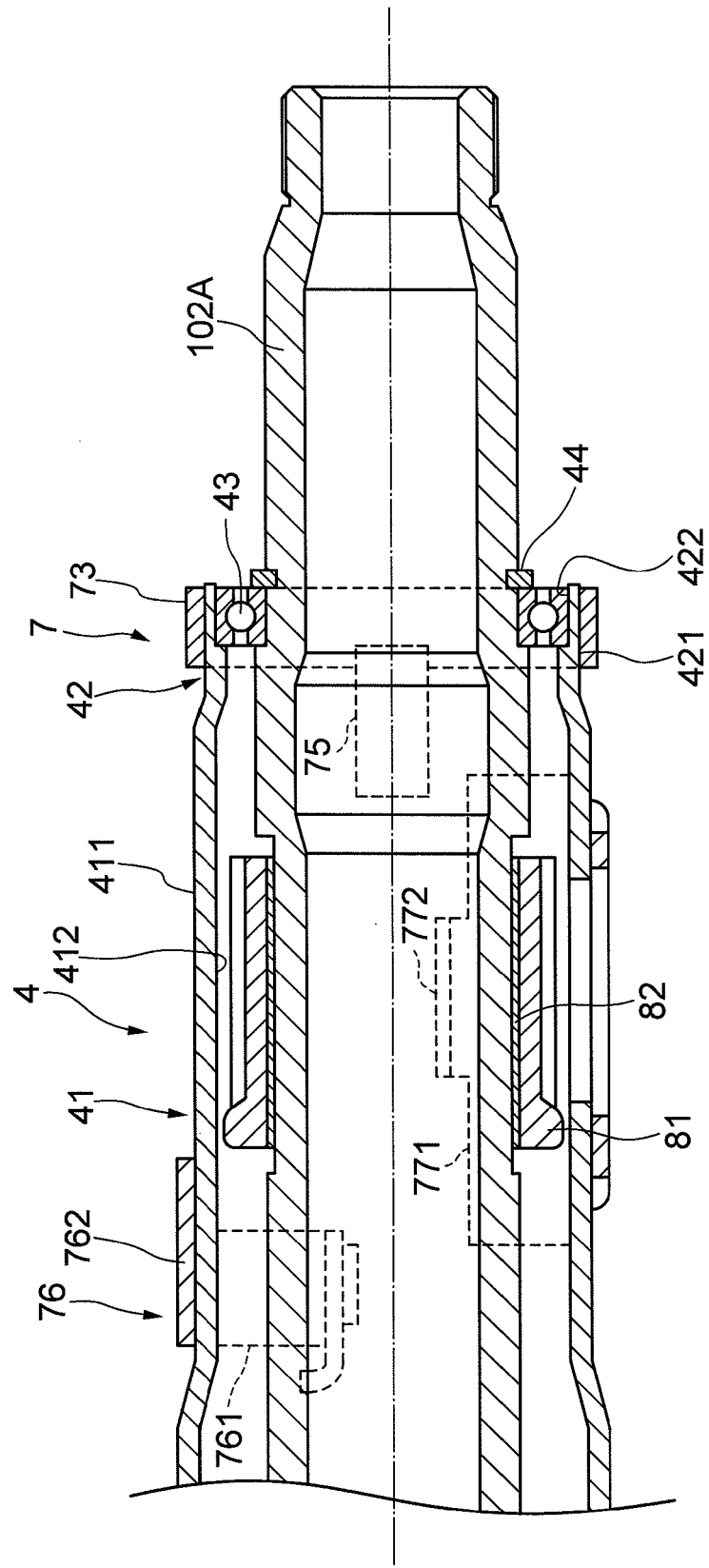
FIG. 6 is a sectional view taken along the line VI-VI in FIG. 4.

FIG. 2 is an exploded perspective view of the principal portion of the steering apparatus 101 according to the embodiment of the present invention as viewed from upside on the front side with respect to the vehicle body. FIG. 3 is a front view illustrating a state before a combination switch is fitted to the steering apparatus 101 according to the embodiment of the present invention. FIG. 4 is a plan view of FIG. 3; FIG. 5 is a sectional view taken along the line V-V in FIG. 3; and FIG. 6 is a sectional view taken along the line VI-VI in FIG. 4.

Figure 7:
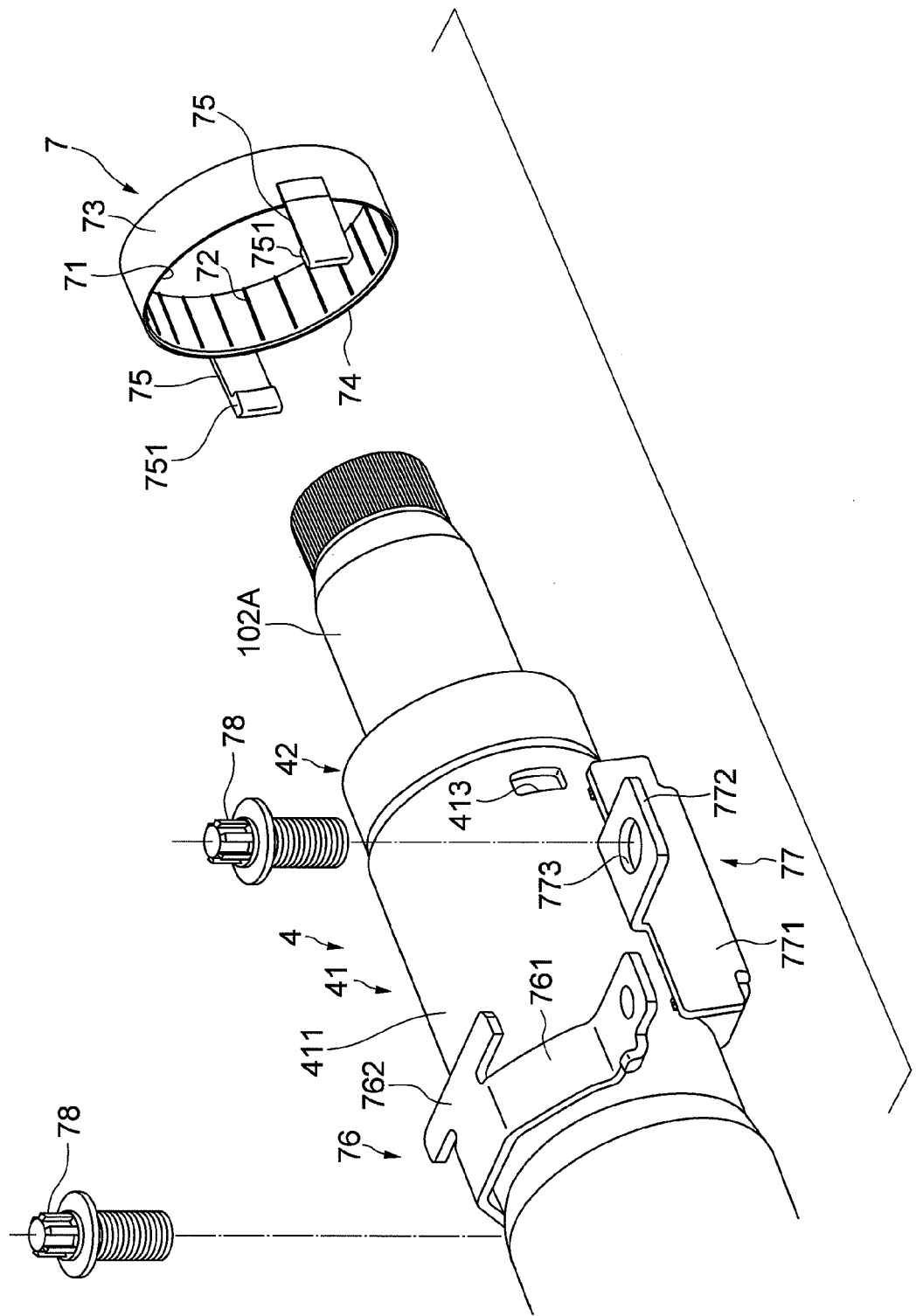
FIG. 7 is an enlarged exploded perspective view as viewed from upside on the front side with respect to the vehicle body, illustrating the vicinity of a column on the rear side with respect to the vehicle body before assembling a spacer to the column.
Figure 8:
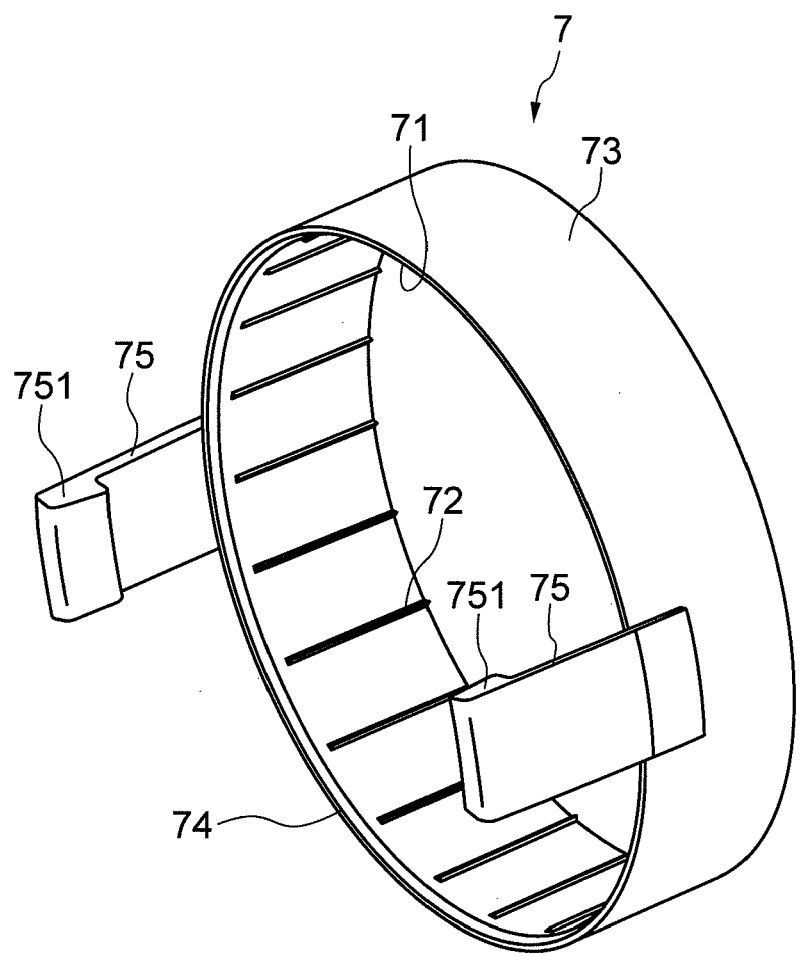
FIG. 8 is an enlarged perspective view of the spacer as a single unit in FIG. 7.
Figure 9C:
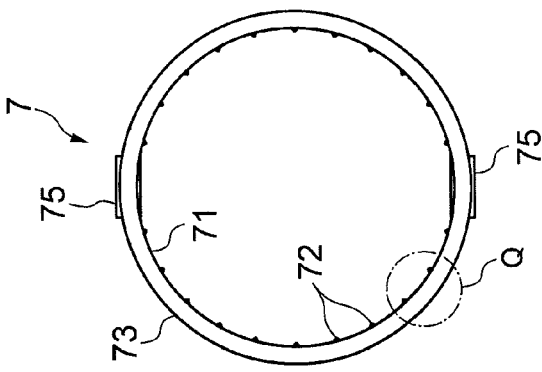
FIGS. 9A-9E depict the single spacer in FIG. 7.
Figure 9E:
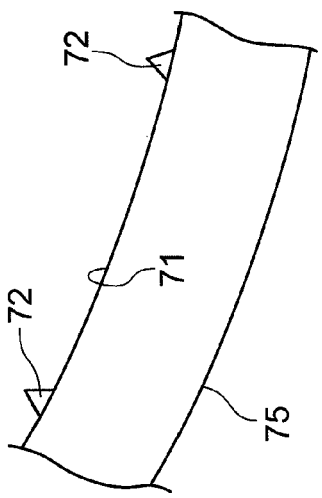
Figure 9B:
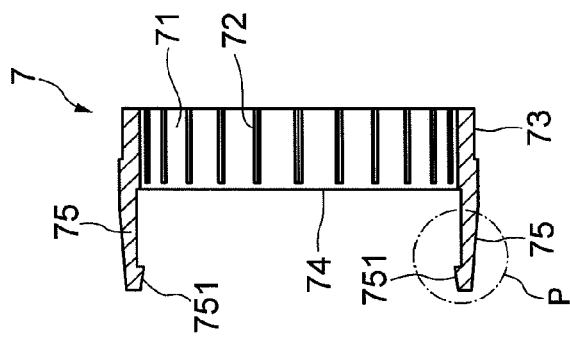
Figure 9D:
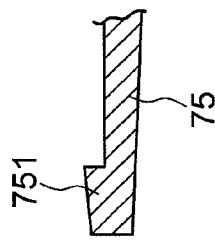
Figure 9A:
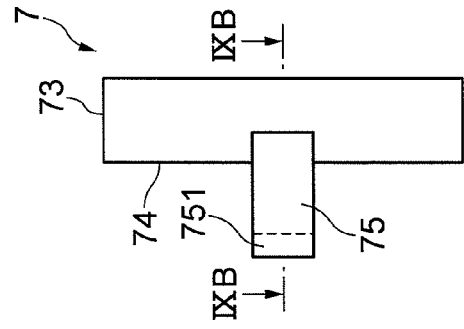

FIG. 7 is an enlarged exploded perspective view as viewed from upside on the front side with respect to the vehicle body, illustrating the vicinity of a steering column on the rear side with respect to the vehicle body before assembling a spacer to the steering column. FIG. 8 is an enlarged perspective view of the spacer as a single unit in FIG. 7. FIGS. 9A-9E depict the single spacer in FIG. 7; FIG. 9A is a front view of the single spacer; FIG. 9B is a sectional view taken along the line IXB-IXB in FIG. 9A; FIG. 9C is a right side view in FIG. 9A; FIG. 9D is an enlarged view of a portion P in FIG. 9B; and FIG. 9E is an enlarged view of a portion Q in FIG. 9C.

Figure 10:
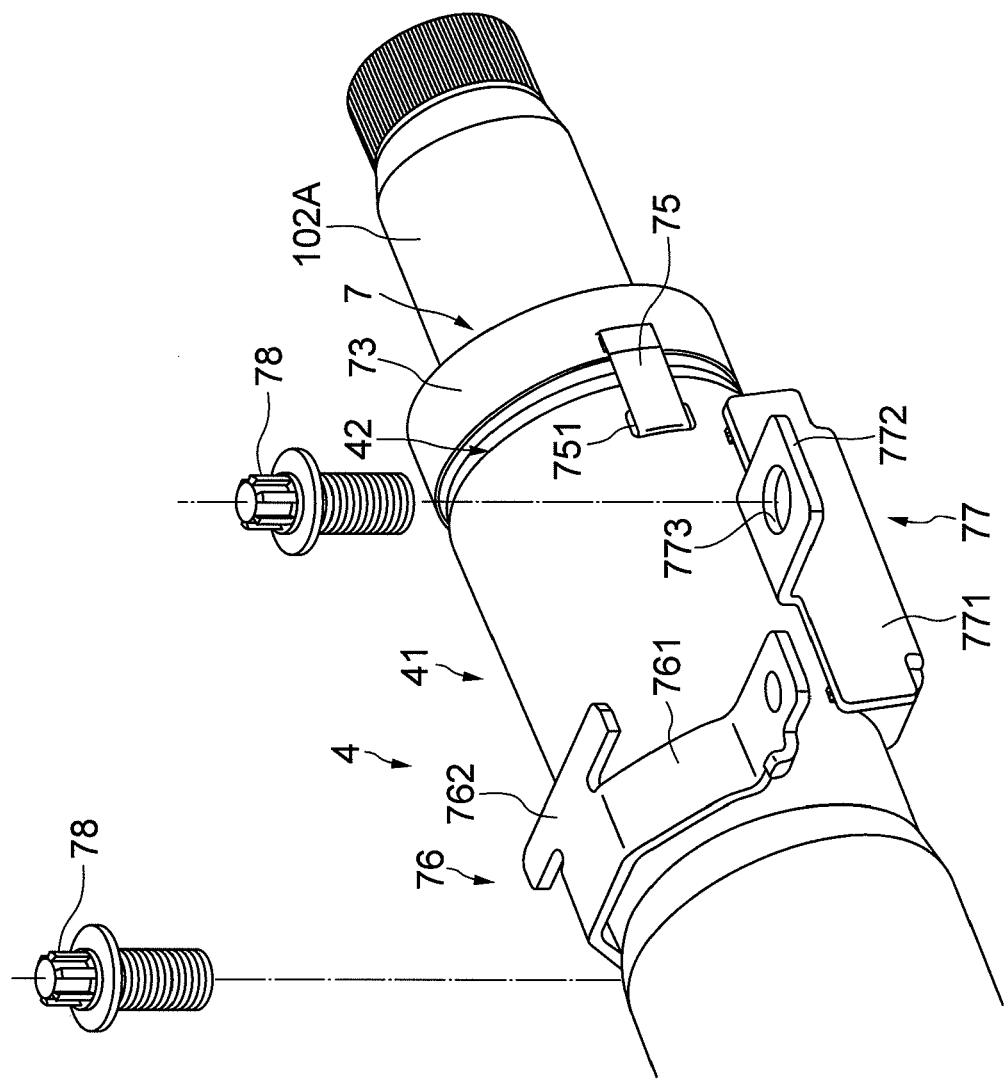
FIG. 10 is an enlarged perspective view as viewed from upside on the front side with respect to the vehicle body, illustrating the vicinity of the column on the rear side with respect to the vehicle body after assembling the spacer to the column.

FIG. 10 is an enlarged perspective view as viewed from upside on the front side with respect to the vehicle body, illustrating the vicinity of the steering column on the rear side with respect to the vehicle body after assembling the spacer to the steering column. FIG. 11 is a front view illustrating a state after the combination switch has been fitted to the steering apparatus 101. FIG. 12 is a view corresponding to FIG. 6, illustrating the state after the combination switch has been fitted to the steering apparatus 101. FIG. 13 is a sectional view taken along the line XIII-XIII in FIG. 12.

As illustrated in FIG. 2 to FIG. 4, the steering apparatus 101 according to the embodiment of the present invention is configured by including an upper steering shaft 102A, a lower steering shaft 102B, a vehicle body fitting bracket 2, an inner column 3 defined as a lower column, an outer column 4 defined as an upper column, a power assist device 5, a combination switch 6, a spacer 7, etc. The vehicle body fitting bracket 2 is fixed to the unillustrated vehicle body via a capsule 23.

As depicted in FIGS. 2 to 4, an inner peripheral surface of the outer column 4 taking a hollow cylindrical shape is fitted on an outer peripheral surface of the cylindrical inner column 3 on the rear side with respect to the vehicle body, slidably in parallel to the central axis line of the inner column 3, i.e., a telescopic position being adjustable. The inner column 3 and the outer column 4 are die-cast molded products of light alloys. The upper steering shaft 102A is supported rotatably within the outer column 4, and the steering wheel 103 is, as illustrated in FIG. 1, fixed to the end of the upper steering shaft 102A on the rear side with respect to the vehicle body.

The power assist device 5 serving as a steering assist unit which gives auxiliary torque is fitted to a portion of the inner column 3 on the front side with respect to the vehicle body. An electric motor 52 is fixed in a gear housing 51 of the power assist device 5, and an unillustrated worm wheel of the gear housing 51 meshes with an unillustrated worm joined to an unillustrated rotary shaft of this electric motor 52.

An unillustrated torque sensor detects a direction and a magnitude of the torque applied to the upper steering shaft 102A from the steering wheel 103. The auxiliary torque is generated in a predetermined direction with a predetermined magnitude via a deceleration mechanism built up by the worm and the worm wheel in a manner that corresponds to detection values of the torque sensor by driving the electric motor 52.

The end portion of the gear housing 51 on the front side with respect to the vehicle body is pivotally supported by the unillustrated vehicle body with a tilt central axis 53 serving as a fulcrum in a way to adjust a tilted position. The outer column 4 is clamped by right and left side plates 24, 24 of the vehicle body fitting bracket 2 slidably for tilt adjustment and telescopic adjustment as well.

The outer column 4 is formed with an unillustrated elongate groove for the telescopic adjustment, which extends long in the axial direction of the outer column 4. Further, the right and left side plates 24, 24 of the vehicle body fitting bracket 2 are formed with elongate grooves for the tilt adjustment, which extend long in a vertical direction of the vehicle body. An unillustrated fastening rod taking a round rod like shape is inserted into the tilt adjustment elongate groove and the telescopic adjustment elongate groove.

When swinging an operation lever 22 fitted to the end of the fastening rod, an unillustrated cam lock mechanism operates, thereby fastening the right and left side plates 24, 24 of the vehicle body fitting bracket 2. As a result, the outer column 4 is firmly fastened by the right and left side plates 24, 24 of the vehicle body fitting bracket 2.

Upon fastening the right and left side plates 24, 24 of the vehicle body fitting bracket 2, the inner peripheral surface of the outer column 4 gets reduced in terms of its diameter, thus firmly clamping the outer peripheral surface of the inner column 3. Therefore, the outer column 4 and the inner column 3 are clamped by the vehicle body fitting bracket 2 in desired tilt and telescopic adjusted positions.

Thus, the inner column 3 is supported on the vehicle body in a way that is enabled to adjust the tilt position through the gear housing 51 configured integrally with this inner column 3.

As depicted in FIGS. 5 to 7, the outer column 4 is formed on the rear side with respect to the vehicle body with a small-diameter cylindrical portion 42, which is smaller or reduced in diameter than a large-diameter cylindrical portion 41 on the front side with respect to the vehicle body. A bearing 43 is press-fitted to an inner peripheral surface 422 of the small-diameter cylindrical portion 42, thus rotatably supporting the upper steering shaft 102A. A dimension of an outer diameter of an outer peripheral surface 421 of the small-diameter cylindrical portion 42 and a dimension of an inner diameter of the inner peripheral surface 422 thereof are set to optimum dimensions corresponding to a displacement etc of an automobile on which the steering apparatus 101 to be mounted. That is, the diameter of the upper steering shaft 102A is set to the optimum size based on the displacement etc of the automobile to be mounted with the steering apparatus 101, a size of the bearing 43 supporting the upper steering shaft 102A is determined based on the size of this diameter, and the small-diameter cylindrical portion 42 of the outer column 4 is configured corresponding to the diameter of the bearing 43. The steering wheel 103 is mounted on the upper steering shaft 102A on the rear side with respect to the vehicle body. An inner ring of the bearing 43 is fixed to the upper steering shaft 102A with the movement of the bearing in the axial direction being hindered by a locating snap ring 44.

A key locking collar 81 is press-fitted via a tolerance ring 82 to the outer periphery of the upper steering shaft 102A. An inner peripheral surface 71 of the hollow cylindrical spacer 7 is fitted onto the outer peripheral surface 421 of the small-diameter cylindrical portion 42. The spacer 7 is composed of a synthetic resin exhibiting a small coefficient of friction and excellent mechanical property such as polyacetal abbreviated to POM, and, as depicted in FIG. 8 through FIGS. 9A-9E, the inner peripheral surface 71 thereof is formed with a plurality of ridges 72. The ridges 72 are formed at equal intervals on a circumference of the inner peripheral surface 71 so as to project inside in a radial direction. The ridges 72, which are interference fitted onto the outer peripheral surface 421 of the small-diameter cylindrical portion 42, are formed substantially over an overall length of the inner peripheral surface 71 in the axial direction.

The combination switch 6 is a switch unit configured to combine a plurality of switches such as a lighting switch and a windscreen wiper switch having functions different from each other into one integral unit, and is, as depicted in FIG. 11, fitted to a portion of the outer column 4 on the rear side with respect to the vehicle body. The combination switch 6 is provided with, as illustrated in FIG. 12, a cylindrical fitting portion 60 extending from the front side with respect to the vehicle body toward the rear side with respect to the vehicle body up to about a middle position of the combination switch 6. A portion of the outer column 4 on the rear side with respect to the vehicle body is fitted to the fitting portion 60. Further, an unillustrated through-hole is formed from the end of the fitting portion 60 on the rear side with respect to the vehicle body to the portion of the combination switch 6 on the rear side with respect to the vehicle body, in which the upper steering shaft 102A penetrates therethrough. As illustrated in FIG. 12, an outer peripheral surface 73 of the spacer 7 is formed to have a dimension of an outer diameter enabling the surface 73 itself to fit onto an inner peripheral surface 61 of the fitting portion 60 of the combination switch 6.

Thus, the use of the spacer 7 enables the combination switch 6 to be employed in common to the steering apparatuses 101 having different diameter sizes of the upper steering shaft 102A and the outer column 4. Namely, with the use of the spacer 7, it is possible to employ the combination switches 6 having the same or common specifications, i.e., taking the same size and the same shape for the plural types of steering apparatuses 101. For attaining this contrivance, the dimension of the inner diameter of the inner peripheral surface 71 of the spacer 7 assembled to each of the plural types of steering apparatuses 101 is set corresponding to the dimension of the outer diameter of the small-diameter cylindrical portion 42, which is different depending on each type of the steering apparatus 101. Further, the outer diameter of the outer peripheral surface 73 of the spacer 7 is set slightly larger than the large-diameter cylindrical portion 41. Accordingly, the spacer 7 in the present embodiment is manufactured as a spacer dedicated to the steering apparatus 101 in the embodiment. To be specific, the spacer 7 is manufactured so that the dimension of the inner diameter of the inner peripheral surface 71 thereof is set corresponding to the dimension of the outer diameter of the outer peripheral surface 421 of the small-diameter cylindrical portion 42 of the steering apparatus 101 in the embodiment, and the dimension of the outer diameter of the outer peripheral surface 73 is the same as the dimension of the outer diameter of the outer peripheral surface of another spacer to be assembled to another type of steering apparatus 101 other than in the present embodiment.

As depicted in FIG. 7, the large-diameter cylindrical portion 41 of the outer column 4 is formed therethrough with an engagement hole 413 from the outer peripheral surface 411 of the large-diameter cylindrical portion 41 to the inner peripheral surface 412 thereof. Totally two engagement holes 413 each taking a rectangular shape are formed one by one on the right and left sides in a widthwise direction of the vehicle with a 180-degree phase shift in the same positions in the axial direction of the large-diameter cylindrical portion 41. The engagement holes 413 are formed in the large-diameter cylindrical portion 41 closer to the front side with respect to the vehicle body than the press-fitted portion of the bearing 43 of the outer column 4, i.e., than the small-diameter cylindrical portion 42. The spacer 7 is, as illustrated in FIGS. 7 and 8, formed with two engagement portions 75, 75 projected frontward with respect to the vehicle body from an end face 74 of the spacer 7 on the front side with respect to the vehicle body. The engagement portions 75, 75 are formed in a face-to-face relationship in the radial direction with the central axis of the spacer 7 being located therebetween. The engagement portions 75, 75 are formed with engagement projections 751, 751 projected inward in the radial direction on the front side with respect to the vehicle body.

A method of fitting the combination switch 6 onto the outer column 4 is as follows. To start with, as depicted in FIGS. 2 and 7, the direction of the spacer 7 is set so that the two engagement portions 75, 75 are positioned respectively on the front side with respect to the vehicle body as well as on the right and left sides in the widthwise direction of the vehicle, and the spacer 7 is fitted onto the outer peripheral surface 421 of the small-diameter cylindrical portion 42 of the outer column 4 from the rear side with respect to the vehicle body. Thereupon, the engagement portions 75, 75 are moved together with the spacer 7 along the outer peripheral surfaces 421, 411 toward the front side with respect to the vehicle body, and simultaneously get elastically deformed outward in the radial direction. Thereafter, the engagement projections 751, 751 of the engagement portions 75, 75 reach the engagement holes 413, 413, at which time the engagement portions 75, 75 resiliently return inward in the radial direction, and the engagement projections 751, 751 engage with the engagement holes 413, 413 as illustrated in FIGS. 5 and 10, thus latching the spacer 7 with the outer column 4. Accordingly, the spacer 7 is positioned with respect to the outer column 4 in the axial direction and the peripheral direction, i.e., the rotating direction. Further, the plurality of projections 72 of the spacer 7 elastically gets deformed and the spacer 7 is thus interference fitted onto the outer peripheral surface 421 of the small-diameter cylindrical portion 42, and hence coaxiality between the outer column 4 and the spacer 7 is improved.

Subsequently, as depicted in FIG. 2, the combination switch 6 is fitted onto the outer peripheral surface 73 of the spacer 7 from the portion of the outer column 4 on the rear side with respect to the vehicle body. The spacer 7 is composed of the synthetic resin exhibiting the small coefficient of friction, and therefore the inner peripheral surface 61 of the fitting portion 60 of the combination switch 6 is guided by the outer peripheral surface 73 of the spacer 7 and smoothly fitted. The combination switch 6 is guided by the outer peripheral surface 73 of the spacer 7 and is, as depicted in FIGS. 11 to 13, fitted to the large-diameter cylindrical portion 41 of the outer column 4 toward the front side with respect to the vehicle body.

As illustrated in FIGS. 7, 10, 12 and 13, a positioning bracket 76 is fixed by welding to the outer peripheral surface 411 of the large-diameter cylindrical portion 41 of the outer column 4. The positioning bracket 76 is configured by including an inverted V-shaped portion 761 welded to a portion of the outer peripheral surface 411 on the upper side with respect to the vehicle body and a rectangular positioning plate 762 that is formed integrally with the inverted V-shaped portion 761 at an upper edge of the inverted V-shaped portion 761.

When the combination switch 6 is fitted onto the large-diameter cylindrical portion 41 toward the front side with respect to the vehicle body, the positioning plate 762 engages with the positioning hole 62 illustrated in FIGS. 12 and 13, which is formed in the end portion of the combination switch 6 on the front side with respect to the vehicle body. As a result, there is completed the positioning of the combination switch 6 with respect to the outer column 4 in the axial direction and the peripheral direction, i.e., the rotating direction.

As depicted in FIGS. 7, 10, 12 and 13, a fitting bracket 77 is fixed by welding to the outer peripheral surface 411 of the large-diameter cylindrical portion 41 of the outer column 4. The fitting bracket 77 is configured by including a pair of right and left L-shaped portions 771, 771 welded to the outer peripheral surface 411 on the lower side with respect to the vehicle body and rectangular fitting plates 772 formed integrally with the L-shaped portions 771, 771 on upper edges of the L-shaped portions 771, 771. The fitting plates 772, 772 are formed with circular bolt holes 773, 773.

Herein, as depicted in FIGS. 2, 11 and 13, a steering lock device 63 is built in the combination switch 6. The steering lock device 63 locks the upper steering shaft 102A not to rotate by engaging an unillustrated lock pin operated by manipulating an ignition key with the key locking collar 81 (see FIGS. 5 and 6). After the positioning of the combination switch 6 in the axial direction and the rotating direction has been completed by the positioning plate 762, bolts 78, 78 are inserted into the bolt holes 773, 773 of the fitting plates 772, 772 and are, as illustrated in FIG. 13, screwed in female screws 631, 631 of the steering lock device 63, thereby fixing the steering lock device 63 to the fitting bracket 77.

The steering lock device 63 is formed integrally with the combination switch 6 and fixed by the bolts 78, 78 to the fitting bracket 77 fixed by welding to the outer column 4, and hence fitting strength to the outer column 4 is large. Thus, the combination switch 6 is fitted to the outer column 4. Note that the steering lock device 63 takes such an integral construction that the steering lock device 63 is built in the combination switch 6 in the present embodiment, however, the steering lock device 63 may also be a device that is separated from the combination switch 6.

As described above, according to the present invention, the combination switch 6 of the same or common specifications can be used in common to a multiplicity of types of cars, thereby reducing a manufacturing cost of the combination switch 6. Further, it is feasible to set the dimension of the outer diameter of the outer peripheral surface 421 and the dimension of the inner diameter of the inner peripheral surface 422 of the small-diameter cylindrical portion 42 irrespective of the dimension of the inner diameter of the inner peripheral surface 61 of the fitting portion 60 which performs centering the combination switch 6. Accordingly, the diameters of the upper steering shaft 102A and of the bearing 43 can be set to the optimum dimensions corresponding to the displacement etc of the automobile on which the steering apparatus 101 to be mounted. As a result, it is possible to restrain an increase in weight of the steering apparatus 101 and a rise in manufacturing cost of the whole steering apparatus 101. Moreover, the projections 72 of the spacer 7 elastically get deformed and are thus interference fitted onto the outer peripheral surface 421 of the small-diameter cylindrical portion 42, whereby vibrations of the vehicle body can be prevented from being transferred to the combination switch 6.

Further, the two engagement portions 75, 75 on the right and left sides in the widthwise direction of the vehicle engage with the two engagement holes 413, 413 of the outer column 4 on the right and left sides in the widthwise direction of the vehicle, with the result that the spacer 7 is latched to the outer column 4 and is thus prevented from rotating in the peripheral direction; a backlash of the combination switch 6 is restrained even when the force acting in the rotating direction is applied to the combination switch 6; and the rigidity of the steering apparatus 101 in the vertical direction can be maintained because of providing the engagement holes 413, 413 on the right and left sides in the widthwise direction of the vehicle. Moreover, the engagement holes 413, 413 are formed closer to the front side with respect to the vehicle body than the portion of the bearing 43 on which the outer column 4 is press-fitted, and hence the engagement portions 75, 75 of the spacer 7 are easy to become flexible to facilitate the assembling. When the combination switch 6 is fitted, the engagement projections 751, 751 can be regulated from disengaging from the engagement holes 413, 413, and it therefore does not happen that the spacer 7 comes off.

What is claimed is:

1. In a steering apparatus configured by including: a steering shaft to which a steering wheel can be fitted; a steering column supported on a vehicle body and supporting the steering shaft rotatably; and a combination switch fixedly fitted to the steering column and constructed by combining a plurality of switches having different functions into one integral unit, the improvement characterized by comprising:

a diameter-reduced portion formed on a rear side portion, with respect to the vehicle body, of the steering column, the diameter-reduced portion being reduced in diameter relative to a front side portion, with respect to the vehicle body, of the steering column;

a bearing fitted in an inner peripheral surface of the diameter-reduced portion and rotatably supporting the steering shaft;

a pair of holes formed on a front side, with respect to the vehicle body, of the steering column, farther front than the bearing; and a spacer having an inner peripheral surface that is fixedly fitted onto an outer peripheral surface of the diameter-reduced portion and an outer peripheral surface that is formed to have a dimension of an outer diameter enabling an inner peripheral surface of a fitting portion provided in the combination switch to be fitted onto the outer peripheral surface;

wherein the spacer is made of a synthetic resin and is provided with a pair of engagement portions each having a projection that engages with a corresponding one of the holes so as to regulate movement of the spacer in an axial direction with respect to the steering column, and an inner peripheral surface of the spacer is formed with a plurality of ridges projecting inward in a radial direction at regular intervals in a circumferential direction over an entire length of the inner peripheral surface in an axial direction, thereby the spacer being interference fitted to the outer peripheral surface of the diameter-reduced portion.

2. The steering apparatus according to claim 1, wherein the engagement portions of the spacer are provided one by one on the right and left sides with respect to the vehicle body in a widthwise direction of the vehicle, and the holes of the steering column are provided one by one on the right and left sides with respect to the vehicle body in a widthwise direction of the vehicle.

3. The steering apparatus according to claim 1, further comprising a positioning bracket that is fixed to the outer peripheral surface of the steering column on the front side, with respect to the vehicle body, and that positions the combination switch in the axial direction and in the rotating direction with respect to the steering column through the engagement with the combination switch.

4. The steering apparatus according to claim 1, wherein a steering lock device for locking the steering shaft not to rotate is built in the combination switch, and the steering apparatus further comprises a fitting bracket that is fixed to the outer peripheral surface of the steering column on the front side with respect to the vehicle body and on which the combination switch is mounted.

5. The steering apparatus according to claim 1, wherein the engagement portions are respectively projected in the axial direction from the outer peripheral surface of the spacer to the front side with respect to the vehicle body.

6. In a steering apparatus configured by including: a steering shaft to which a steering wheel can be fitted; a steering column supported on a vehicle body and supporting the steering shaft rotatably; and a combination switch fixedly fitted to the steering column and constructed by combining a plurality of switches having different functions into one integral unit, the improvement characterized by comprising:

a diameter-reduced portion formed on a rear side portion, with respect to the vehicle body, of the steering column, the diameter-reduced portion being reduced in diameter relative to a front side portion, with respect to the vehicle body, of the steering column;

a bearing fitted in an inner peripheral surface of the diameter-reduced portion and rotatably supporting the steering shaft;

a hole portion formed on a front side, with respect to the vehicle body, of the steering column, farther front than the bearing; and a spacer having an inner peripheral surface that is fixedly fitted onto an outer peripheral surface of the diameter-reduced portion and an outer peripheral surface that is formed to have a dimension of an outer diameter enabling an inner peripheral surface of a fitting portion provided in the combination switch to be fitted onto the outer peripheral surface, wherein the spacer is made of a synthetic resin and is provided with a regulating portion that engages with the hole portion so as to regulate movement of the spacer in an axial direction with respect to the steering column, and the inner peripheral surface of the spacer is formed with a plurality of ridges projecting inward in a radial direction at regular intervals in a circumferential direction over an entire length of the inner peripheral surface in an axial direction, thereby the spacer being interference fitted to the outer peripheral surface of the diameter-reduced portion.

7. The steering apparatus according to claim 6, further comprising a positioning bracket that is fixed to the outer peripheral surface of the steering column on the front side with respect to the vehicle body and that positions the combination switch in the axial direction and in the rotating direction with respect to the steering column through the engagement with the combination switch.

8. The steering apparatus according to claim 6, wherein a steering lock device for locking the steering shaft not to rotate is built in the combination switch, and the steering apparatus further comprises a fitting bracket that is fixed to the outer peripheral surface of the steering column on the front side with respect to the vehicle body and on which the combination switch is mounted.

9. The steering apparatus according to claim 6, wherein the regulating portion is projected in the axial direction from the outer peripheral surface of the spacer to the front side with respect to the vehicle body.

* * * * *